United States Patent Office 3,284,222
Patented Nov. 8, 1966

3,284,222
VALUABLE PRODUCT FROM MONTAN RESIN
AND PROCESS FOR ITS MANUFACTURE
Walter Brotz, Gersthofen, near Augsburg, and Karl Maier, Augsburg, Germany, assignors to Farbwerke Hoechst Aktiengesellschaft vormals Meister Lucius & Brüning, Frankfurt am Main, Germany, a corporation of Germany
No Drawing. Filed July 9, 1963, Ser. No. 293,867
Claims priority, application Germany, July 20, 1962,
F 37,368
5 Claims. (Cl. 106—239)

The present invention relates to a novel valuable product from montan resin and to a process for its manufacture.

Montan wax, as obtained by extraction from lignite, contains up to 30% of a resin essentially consisting of resin acids, resin alcohols, resin esters and resenes.

This resinous portion must be removed prior to the improvement of the montan wax by oxidative bleaching. For this purpose the montan wax is subjected to an extraction with a solvent. After the recovery of the solvent a commercial montan resin is obtained as waste product still containing about 20% of wax constituents. The product has a dropping point (according to Ubbelhode) of 50–70° C. and an acid number of 20–50.

The commercial crude montan resin has hitherto not been suitable as film-forming agents and protective layer, for example, for concrete and wood, and above all for temporarily protecting metals against corrosion because of its poor solubility in the necessary, cheap, inert, and physiologically harmless gasoline hydrocarbons at normal temperature and its dropping point which does not comply with the practical demands on the resistance to high temperatures.

It has now been found that a valuable, readily gasoline-soluble product having a high dropping point can be produced from commercial montan resin when the free acid of the resin is wholly or partially converted into the lithium salt.

The commercial montan resin can be transformed into the lithium salt by saponification in the presence or absence of water. In either case the reaction is preferably carried out with lithium hydroxide. It is especially suitable to use commercial lithium hydroxide which still contains large amounts of lithium carbonate. Other lithium compounds may likewise be used, for example all lithium salts derived from acids having not too low a volatility. For economic reasons it is preferred to use the lithium salts of readily volatile acids which are accessible on a large scale, for example lithium chloride or lithium carbonate.

It is not absolutely necessary that the hydrogen atoms of all carboxyl groups of the montan resin are replaced by lithium atoms, however, a substantial saponification of the carboxyl groups being preferred. In this manner products are obtained which are well soluble in gasolines and have relatively high dropping points, especially when the montan resin having an acid number in the range of from about 25 to 50 is saponified with lithium compounds to an extent such that the acid number of the resulting product is smaller than 2. While the dropping points of non-saponified montan resin ranges between about 55 and 70° C., the saponification products suprisingly have dropping points above 70° C. Products having an acid number below 2 have generally a dropping point in the range of from 80 to 95° C.

If a quantitative or substantially quantitative saponification is desired the amount of lithium compound used must be equivalent to the free carboxyl groups contained in the montan resin. In the case of a partial saponification a smaller amount of lithium compound should be used. The content of free carboxyl groups in the montan resin used as starting product can vary within certain limits and can be determined according to known analytical methods.

The product obtained by the process of the invention can be used for temporarily protecting wood, concrete, or metals against the action of humidity or against corrosion. The product may be mixed with plasticizers, such as high boiling esters, for example esters of phthalic acid, citric acid or adipic acid with aliphatic alcohols having 1–10 carbon atoms or with high boiling aliphatic or cycloaliphatic hydrocarbons, preferably having a boiling point above 200° C. and/or admixed with fillers such as China clay, calcium carbonate or silicic acid.

The lithium salt of the crude montan resin is well soluble in hydrocarbons. Since the solvents used for making solutions for commercial applications shall not be too difficultly volatile, is it advantageous to employ as solvents aliphatic hydrocarbons having 5–8 carbon atoms and boiling at atmospheric pressure at a temperature in the range of from room temperature to about 120° C.

The following example serves to illustrate the invention but it is not intended to limit it thereto.

Example 100 kilograms of commercial montan resin were melted at 90° C. and 5 kilograms of water were stirred into the melt. 2 kilograms of commercial lithium hydroxide (content of LiOH 53%) were added in the form of a fine powder, while stirring. The temperature of the mass was slowly raised to 120° C. As soon as the development of foam subsided, the mass was heated at 140° C. until the total amount of water had been expelled. The mass was poured out and allowed to cool. The properties of the product are recited in the following table, in comparison with the properties of the commercial montan resin used as starting material.

|  | Commercial montan resin (starting material) | Lithium salt of the montan resin according to the invention |
|---|---|---|
| Acid number | 25 | <1. |
| Dropping point (Ubbelohde) | 63° C | 95° C. |
| Cloud point of a 10% solution in white spirit. | 37° C | –5° C. |
| Appearance of a 10% solution in white spirit after 24 hours' storage at 20° C. | Turbid, much sediment. | Limpid, transparent, no sediment. |
| Film from a 10% solution in white spirit. | Heterogeneous, opaque with many specks (small swollen particles), brittle. | Homogeneous, transparent, glossy, flexible. |

We claim:
1. A process for the manufacture of a gasoline-soluble product having a high dropping point which comprises saponifying the free acid contained in montan resin hav- ing an acid number between 20 and 50 to form the lithium salt of said montan resin having an acid number below 2.

2. The process of claim 1 wherein lithium hydroxide is used for the salt formation.

3. A montan resin composition comprising the lithium salt of montan resin having an acid number below 2.

4. The montan resin composition according to claim 3 having a dropping point of between 80° C. and 95° C.

5. A montan resin solution comprising a solution of the lithium salt of montan resin having an acid number below 2 in an aliphatic hydrocarbon having from 5 to 8 carbon atoms.

References Cited by the Examiner
UNITED STATES PATENTS
2,963,379 12/1960 Kaupp et al. _____ 106—270

FOREIGN PATENTS
202,263 6/1924 Great Britain.
448,930 6/1936 Great Britain.

ALEXANDER H. BRODMERKEL, *Primary Examiner.*

L. HAYES, *Assistant Examiner.*